United States Patent [19]

Ohtani et al.

[11] Patent Number: 5,212,432
[45] Date of Patent: May 18, 1993

[54] INDUSTRIAL ROBOT

[75] Inventors: Yukio Ohtani, Kawasaki; Yoshiko Iriyama, Tokyo; Satoshi Uehara, Yokohama, all of Japan

[73] Assignee: Tokico, Ltd., Japan

[21] Appl. No.: 845,494

[22] Filed: Feb. 28, 1992

Related U.S. Application Data

[63] Continuation of Ser. No. 599,342, Oct. 17, 1990, abandoned.

[30] Foreign Application Priority Data

Oct. 20, 1989 [JP] Japan ................................. 1-273104
Oct. 20, 1989 [JP] Japan ................................. 1-273108

[51] Int. Cl.[5] ............................................. G05B 19/10
[52] U.S. Cl. ................................. 318/568.11; 901/49; 310/56
[58] Field of Search ..................................... 310/52-59, 310/60 A, 68 C; 901/49, 50, 22-23; 318/561, 568.1, 568.11, 625, 641, 642, 644

[56] References Cited

U.S. PATENT DOCUMENTS

| | | | |
|---|---|---|---|
| 3,753,013 | 8/1973 | Boermann et al. | 310/54 |
| 3,894,138 | 7/1975 | Klaar | 310/53 |
| 3,984,715 | 10/1976 | Kullman et al. | 310/219 |
| 4,076,340 | 2/1978 | Meinke et al. | 308/10 |
| 4,429,245 | 1/1984 | Muller et al. | 310/261 |
| 4,703,157 | 10/1987 | Dahlquist | 219/121 |
| 4,733,050 | 3/1988 | Grafius | 219/125.1 |
| 4,876,492 | 10/1989 | Lester et al. | 318/254 |

Primary Examiner—Paul Ip
Assistant Examiner—David Martin
Attorney, Agent, or Firm—Scully, Scott, Murphy & Presser

[57] ABSTRACT

An industrial robot which can be used as a painting robot is mainly constructed by a robot body having a plurality of of motor spaces spaces for housing electric motors. A plurality of guiding passages for flowing in and a plurality of exhaust passages for flowing out a protective gas are formed in the plurality of motor spaces. Also, the robot body has a plurality of temperature sensors for detecting temperatures in the plurality of motor spaces therein. In addition, the robot has gas supplying means for supplying a protective gas into the plurality of passages.

9 Claims, 7 Drawing Sheets

INDUSTRIAL ROBOT

This is a continuation of copending application Ser. No. 599,342 filed on Oct. 17, 1990 now abandoned.

BACKGROUND OF THE INVENTION

1. Field of the Invention

The present invention relates to an industrial robot provided with direct-drive motors as the driving means, especially appropriate for painting.

2. Prior Art

Recently, industrial robots are used for carrying out the various kinds of works, by executing the corresponding working programs, as machines for automatically painting, welding an the like, instead of men.

Such and industrial robot should have the body constructed in an explosion-proof manner, when it is used in a flammable atmosphere. Here, the explosion-proof manner means the manner with which the atmosphere prevents catching fire from the spark and the like, even if the electric parts of the robot produce sparks and the like. Especially, as the painting robot puts the body in the atmosphere where the flammable solvent vapors exist, the hydraulic robot is conventionally used, for the reason that the design for the explosion-proof construction is relatively simple.

However, the hydraulic robot has the disadvantages that it needs the hydraulic unit and the maintenance thereof is troublesome. Therefore, recently, an electrical robot is used as a painting robot, instead of the hydraulic robot.

Meanwhile, the above-mentioned electric robot must be provided with a plurality of electric elements, such as the motor, electric wire connected to the motor and the like, as the explosion-proof objects. For this reason, the electric robot should be constructed in an explosion-proof manner, so it has several kinds of disadvantages as follows.

In case of the robot which adopts the internal pressure explosion-proof construction as an explosion-proof manner, the scavenging gas, such as air, is blown into the space where the electric elements are arranged. And the internal pressure is increased and then the scavenging gas is exhausted from the space. Thus, at the time of use, the above-mentioned space is scavenged by the scavenging gas, so the external atmosphere is prevented from being in contact with the electric elements within the robot.

However, in the conventional robot constructed in an internal pressure explosion-proof manner, as the gas passage system thereof is complicated and the pressure loss becomes large, it takes much time to scavenge and the stagnation easily occurs in the gas flow. Therefore, a difficult problem arises that these shortcomings reduce the explosion-proof reliability.

Particularly, in case of the robot arm (the second arm), providing the wrist mechanism at the end portion, wherein the motor for driving the wrist mechanism is located, the above-mentioned problems have arisen. Because, the conventional technique cannot cause the scavenging gas to flow efficiently into the place where the motor is arranged, because the gas passage system, at the place where the motor is arranged, becomes so much complicated.

Further, the conventional electric painting robot should arrange the wires such as the power line of the motor in the narrow and complicated space within the main unit thereof, so that the assembly operation thereof must be difficult. In addition, it is difficult to wire the robot with enough room to be remained. Due to such difficulties of wiring, excess force can be easily applied to the wires when the robot moves. Therefore, the reliability of the robot becomes low because there is possibility in that the wires can be broken with ease.

SUMMARY OF THE INVENTION

In view of the above, it is an object of the present invention to provide an industrial robot, constructed in an internal pressure explosion-proof manner, wherein the fluid resistance of the scavenging gas can be appreciably lowered, by applying a direct-drive motor which does not need reduction gears to the robot, so that the gas can flow without stagnating.

In a first aspect of the present invention, there is provided an industrial robot including:

(a) a robot body having a plurality of motor spaces therein;

(b) a plurality of motor spaces for housing electric motors;

(c) a plurality of electric motors for driving said robot body, each motor housed in one of said plurality of motor spaces;

(d) a plurality of guiding passages for flowing in a protective gas, formed in one of said plurality of motor spaces;

(e) a plurality of exhaust passages for flowing out said protective gas, each exhaust passage formed in one of said plurality of motor spaces;

(f) gas supplying means for supplying a protective gas into said plurality of passages under a predetermined pressure which is higher than an ambient pressure; and (g) a plurality of temperature sensors for detecting a temperature in one of said plurality of motor spaces, each temperature sensor formed in one of said plurality of motor space.

In a second aspect of the present invention, there is provided an industrial robot including:

an electric motor having a stator and a rotor for driving a rotot body, wherein the stator has an open-ended hollow space, providing a filler member which is lighter than a material for forming the stator in weight therein, wherein the rotor is arranged such that it surrounds a outer periphery of said stator.

According to the second aspect of the present invention, because meaningless parts of hollow spaces are filled with filler member, the time required for scavenging can be shortened more than the scavenging time in the first aspect of the present invention.

In addition, this second aspect has advantage that the explosion-proof function can be achieved with high efficiency and high reliability, more than in the first aspect.

BRIEF DESCRIPTION OF THE DRAWINGS

The present invention will now be illustrated with reference to the accompanying drawings wherein.

DESCRIPTION OF PREFERRED EMBODIMENTS

Figure 1:
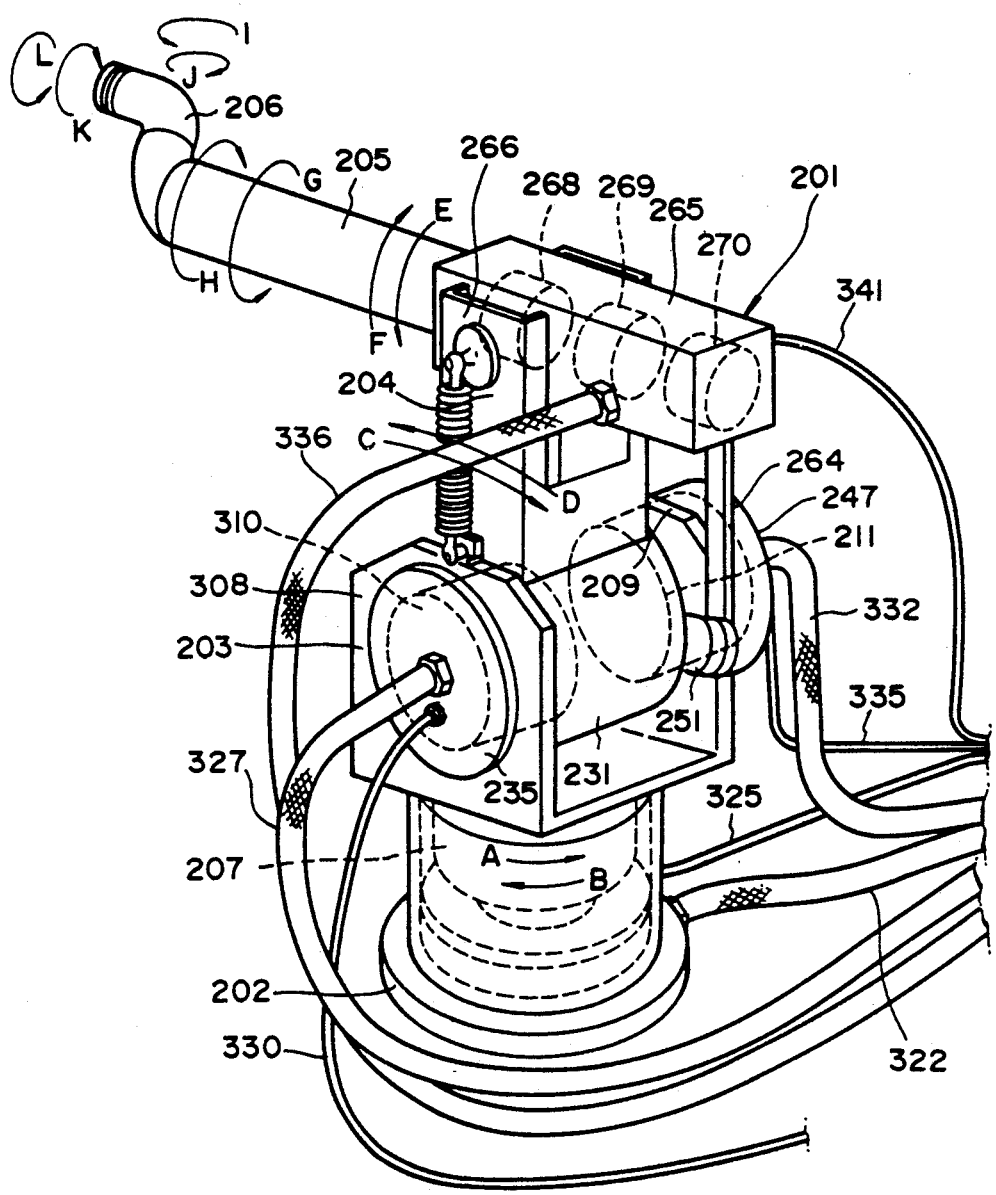
FIG. 1 is a perspective view illustrating the robot according to a first embodiment of the present invention.
Figure 3:
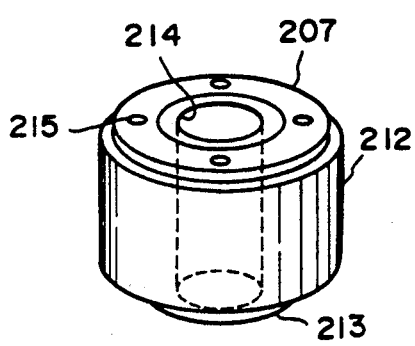
FIG. 3 is a perspective view illustrating a motor used in the robot in FIG. 1.
Figure 4:
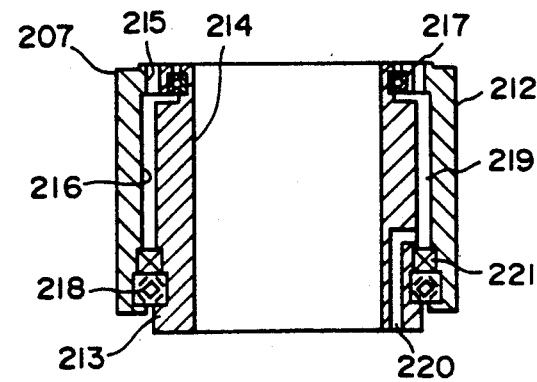
FIG. 4 is a vertical sectional view of the motor shown in FIG. 3.

In the following section, preferred embodiments of the present invention will be described with reference to the drawings.

[C] FIRST EMBODIMENT

(1) Construction

Next, description will be given with respect to a first embodiment of the present invention by referring to FIGS. 1 to 6 in the drawings.

The electric robot illustrated in FIG. 1 is playback type robot which is used, for example, as a painting robot. This robot 201 comprises a base 202, a rotary table 203, a first arm 204, an second arm 205 and a wrist mechanism 206. Herein, the rotary table 203 can freely rotate in A and B directions on the base 202. The first arm 204 stands on the rotary table 203 and can freely rotate in C and D directions. The second arm 205 is supported at the upper end portion of the first arm 204 such that it can freely rotate in E and F directions. And the wrist mechanism 206 is provided at the tip end portion of second arm 205 such that it can freely rotate in G and H directions.

Figure 2:
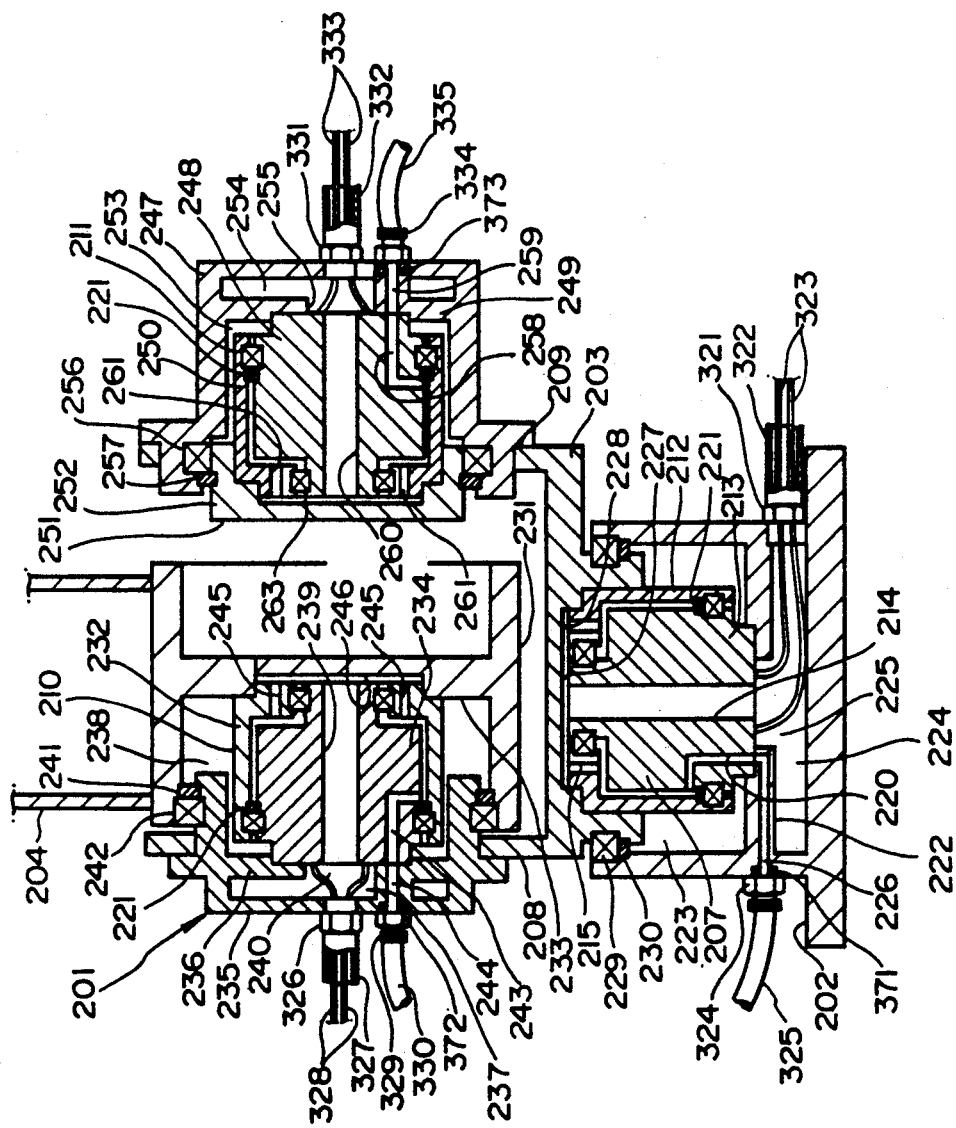
FIG. 2 is a vertical sectional view showing an essential part of the robot shown in FIG. 1.

Next, as illustrated in FIGS. 1 and 2, reference numberal 207 designates a motor for driving the rotary table 203, which is provided within the base 202. The rotary table 203 has brackets 208 and 209. A motor 210 for driving the first arm 204 is provided at the bracket 208 of the rotary table 203, while a motor for driving the second arm 205 is provided at another bracket 209 of the rotary table 203. Each of these motors 207, 210 and 211 is designed as the direct-drive motor. Since these motors have the same construction, description will be only given with respect to the motor 207 by referring to FIGS. 3 and 4.

The motor 207 mainly comprises a rotor 212 and a stator 213 both having a cylindrical shape. A central hole 214 having a large radius, for gas passage is formed through the central portion of stator 213 along the shaft axis, while a plurality of peripheral holes 215 for gas passages is formed through the annular plate of rotor 212 in the axial direction. The stator 213 is inserted into the inner peripheral space of the rotor 212. Thus, the annular space 219 is formed between an inner periphery 216 of the rotor 212 and an outer periphery of the stator 213. The rotor 212 is supported by the stator 213 via bearings 217 and 218, so that it can freely rotate by bearings 217 and 218. In addition, the peripheral holes 215 in the rotor 212 are formed to communicate with the annular space 219 between the rotor 212 and stator 213. A communicating hole 220 for gas passage is formed in the stator 213 such that it communicates with the annular space 219.

Next, an oil seal 221 is filled beneath the annular space between the rotor 212 and stator 213, such that the annular space 219 is not in contact with the outside air, that is, such that it is in an airtight manner.

As illustrated in FIG. 2, in the motor 207 having the above-mentioned construction, the bottom portion of stator 213 is mounted on and fixed to a bulkhead 222, formed as a fixed portion in the base 202. The inside space of the base 202 is divided into a motor space 223 for mounting the motor 207 and another space 224. A hole 225 (gas passage) is provided at the center of the bulkhead 222, such that it communicates the motor space 223 with space 224. A passage 226 is formed in the bulkhead 222. The stator 213 in the motor 207 is mounted on and fixed to the bulkhead 222, such that the communicating hole 220 communicates with the passage 226. The rotor 212 of the motor 207 is fitted in and fixed to a recess 227 formed at the bottom of the rotary table 203. At this recess 227, there is provided a passage 228 for the communication between the central hole 214 of stator 213 and peripheral hole 215 of the rotor 212, in the horizontal direction. In addition, the rotary table 203 is supported by the base 202 such that it can freely rotate in A and B directions (see FIG. 1) via a bearing 229. The oil seal 230 is inserted between the rotary table 203 and base 202. In the motor 207, the rotation of rotor 212 is directly transmitted to the rotary table 203. More specifically, the rotation of the motor 207 is transmitted to the rotary table 203 at the transmission ratio of one to one (1:1), without the reduction of rotation. Thus, the motor 207 drives the rotary table 203 directly. Herein, the motor (direct-drive motor) 207 is the servo motor, which can achieve stable rotation at low speed. This servo motor is advantageous in that the change-over of its speed can be made electrically, its maintenance is not troublesome and therefore it has a long lifetime.

The motor 210 for driving the first arm 204 is similar in construction to the above-mentioned motor 207. As shown in FIG. 2, this motor 210 is assembled between the bracket 208 of the rotary table 203 and a lower end portion of the first arm 204. That is, a rotor 232 of the motor 210 is fitted in and fixed to a recess 233 formed in the housing 31 of first arm 204, while a stator 234 thereof is fixed to a cover 235 which is mounted to the bracket 208. This cover 235 having almost cylindrical shape and a shut end at one side, provides a bulkhead 236 at which the stator 234 is fixed. A space 237 (gas passage) is formed between the bulkhead 236 and the shut end, while a motor space 238 for mounting the motor 210 is formed between the bulkhead 236 and recess 233. At the center of the bulkhead 236, a hole 240 (gas passage) is formed, such that the space 237 and a central hole 239 (gas passage) of the motor 210 are communicated together.

Between the outer periphery of the cover 235 and the inner periphery of housing 231 at edge portion in the direction of cover 235, a bearing 242 and an oil seal 241 are provided. The oil seal 241 seals the space between these in an airtight manner. Thus, the first arm 204 located on the rotary table 203 via the cover 235, motor 210 and bearing 242, can freely rotate in C and D directions (see FIG. 1). Thus, the motor space 238 is set in an airtight manner with oil seal 241. In addition, in the cover 235, there is provided a passage 244 for the communication with a communicating hole 243 formed in the motor 210. Reference numerals 245 are peripheral holes formed in the motor 210. At the bottom of recess 233, there is provided a passage 246 for having communication between the central hole 239 and peripheral holes 245 of the motor 210.

The motor 211 for driving the second arm 205 is housed in a motor case 247 which is provided and fixed at the bracket 209 of the rotary table 203. A stator 248 of the motor 211 is fixed to a bulkhead 249 formed in the motor case 247, while a rotor 250 is fixed to a cover 252 at an end of a horizontal link 251. The cover 242 is mounted to cover the opening of the motor case 247 such that it can freely rotate. The inside space of the motor case 247 is divided into a motor space 253 and another space 254 by the bulkhead 249. Further, in the bulkhead 249, there is formed a hole 255 for communication between the motor space 253 and space 254.

The horizontal link 251 is supported by motor case 247 via a bearing 256 such that it can freely rotate. In addition, an oil seal 257 seals the gap between the inner periphery of an end portion, in the direction of horizontal link, of motor case 247 and the cover 252 of horizontal link 251. Thus, the horizontal link 251 can freely rotate about the rotary table 203 via the motor case 247 and motor 211. passage 259 is formed in the motor case 247 such that it communicates with a communicating hole 258. Reference numeral 260 is a central hole formed in the stator 248, while reference numerals 261 are peripheral holes formed in the rotor 250. In the inside of cover 252 in horizontal link 251, there is formed a passage for having communication between the central hole 260 and peripheral holes 261. The other end portion of horizontal link 251 extends backward as shown in FIG. 1. And the lower end portion of a vertical link 264 is linked to the other end portion of the horizontal link 251 such that it can freely rotate, while its upper edge portion is linked to a motor space 265 which is provided at the rear end portion of the second arm 205 shown in FIG. 5, such that it can freely rotate.

Therefore, the horizontal link 251 is directly driven by the motor 211 which rotates, so that the vertical link 264 is displaced in the upward or downward direction. Thus, the second arm 205 rotates in E and F directions (see FIG. 1). The motor space 265 of second arm 205 is supported, such that it can freely rotate, by the supporting portion 266 which is provided at the upper edge portion of the first arm 204.

Figure 5:
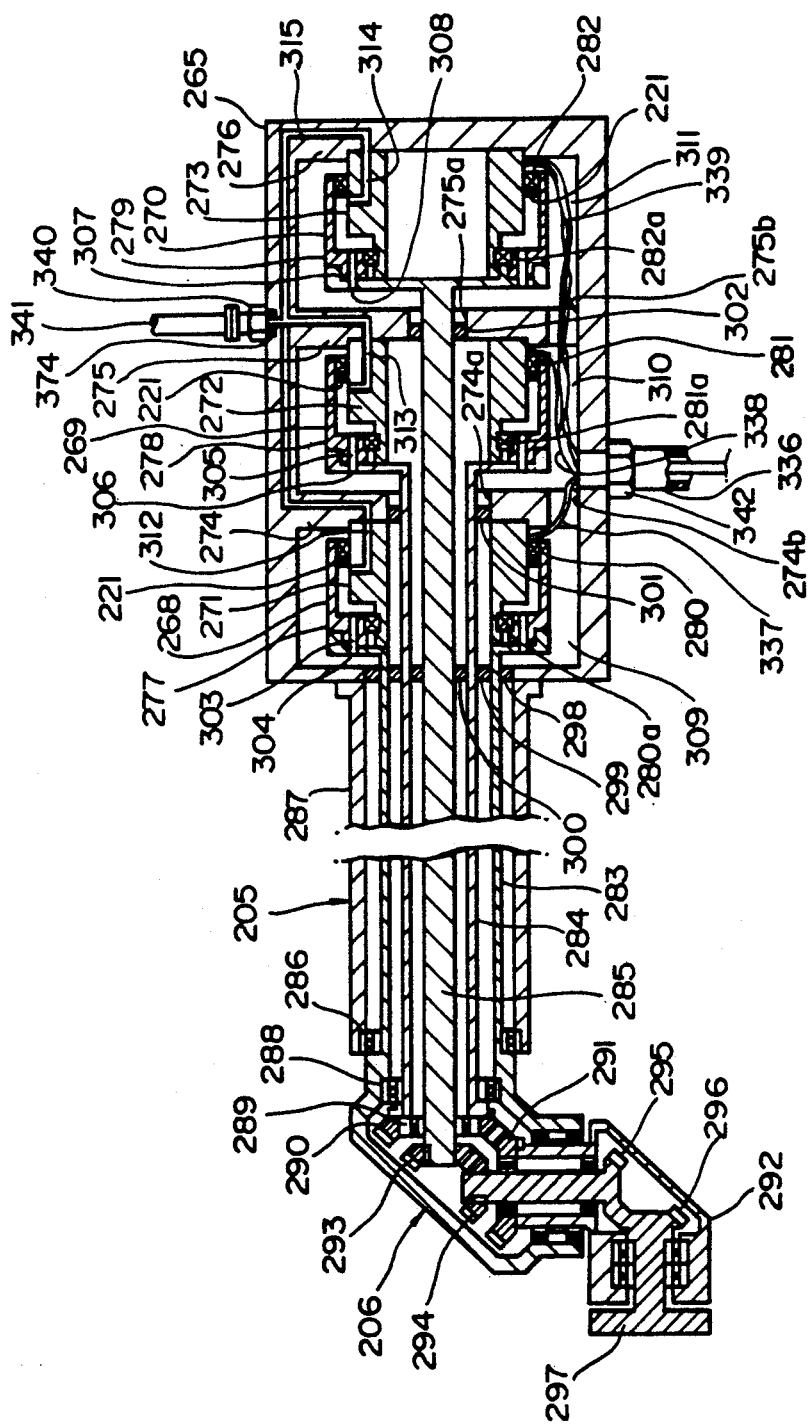
FIG. 5 is a horizontal sectional view of an second arm shown in FIG. 1.

In this motor space 265, motors 268, 269 and 270 are housed in order to drive the wrist mechanism 206 in G, H and I, J and K, L directions respectively, as illustrated in FIG. 13. Each of the motors 268, 269 and 270 has the same construction as the foregoing motor 207. As shown in FIG. 5, these motors 268, 269 and 270 have respective stators 271, 272 and 273 which are respectively fixed to walls 274, 275 and 276. These walls are formed respectively at intervals in the motor space 265. Rotors 277, 278 and 279 of the motors 268, 269 and 270 are respectively supported by respective stators 271, 272 and 273 via bearings 280, 280a; 281, 281a; 282, 282a such that they can freely rotate. Each of these rotors 277, 278 and 279 is linked together to each of shafts 283, 284 and 285 in the second arm 205, wherein these shafts are arranged along the central axis thereof in a coaxial manner. Holes 274a, 274b are formed in the wall 274, while holes 275a, 275b are formed in the wall 275. The shaft 283 is supported by a cylindrical portion 287 of second arm 205 via a bearing 286, shaft 284 is supported by the shaft 283 via a bearing 288, while shafts 285 is supported by the shaft 284 via a bearing 289, such that they can freely rotate respectively. Each shaft 283, 284 and 285 is directly driven by each motor 268, 269 and 270 respectively, without any speed reduces between them. Incidentally, the oil seals which are similar to the oil seal 221 in the motor 207, are respectively provided adjacent to the bearings 280, 281 and 282. The shaft 283 drives the wrist mechanism 206 in G and H directions (see FIG. 1), the shaft 284 rotates a wrist case 292 via bevel gears 290 and 291 in I and J directions (see FIG. 13), while the shaft 285 rotates a tool 297 for mounting a painting gun via bevel gears 293, 294, 295 and 296 in K and L directions (see FIG. 1).

Next, oil seals 298, 299 and 300 seal the spaces between the motor space 265 and respective shafts 283, 284 and 285 in an airtight manner. Similarly, an oil seal 301 seals the space between the shaft 284 and wall 274, while another oil seal 302 seals the space between the shaft 285 and wall 275. Thus, the motor space 265 has an airtight construction.

In addition, plural throughholes 304 are formed in the shaft 283 such that they communicate with plural peripheral holes 303 formed in rotor 277 of the motor 68. Plural throughholes 306 are formed in the shaft 284 such that they communicate with plural peripheral holes 305 formed in rotor 278 of the motor 269. And also, plural throughholes 308 are formed in the shaft 285 such that they communicate with plural peripheral holes 307 formed in rotor 278 of the motor 69. The inside of motor space 265 is divided into spaces 309, 310 and 311 by the walls 274, 275 and 276. These motors are respectively housed in these spaces. Peripheral holes 303, 305 and 307 formed in the rotors 277, 278 and 279 of the motors, communicate with the spaces 309, 310 and 311 via through holes 304, 306 and 308. A passage 315 is formed in the outer peripheral wall and wall 274, 275 and 276 such that it communicates with communicating holes 312, 313 and 314 formed in the stators 271, 272 and 273.

As shown in FIG. 2, a tube 322 is connected to the base 202 via a connector 321. A cable 323 is inserted in the tube 322 and is connected to the motor 207. A tube 325 is connected to the opening of the passage 226 of the base 202 via joint 324. In addition, a tube 327 is connected to the cover 235 via a connector 326. A cable 328 is inserted in the tube 327 and is connected to the motor 210. One end of a tube 330 is connected to the passage 244 in the cover 235 via a joint 329, while one end of a tube 332 is connected to the motor case 247 via a connector 331. A cable 333 is inserted in the tube 332 and is connected to the motor 211. And also, one end of a tube 335 is connected to the passage 259 of the motor case 247 via a joint 334.

One end of a tube 336 is connected to the motor space 265 located at the rear end portion of the second arm 205, via a connector 342. Cables 337, 338 and 339, connected to respective motor 268, 269 and 270. are inserted in the tube 336. A tube 341 is connected to an opening end of passage 315 via a joint 341.

Figure 6:
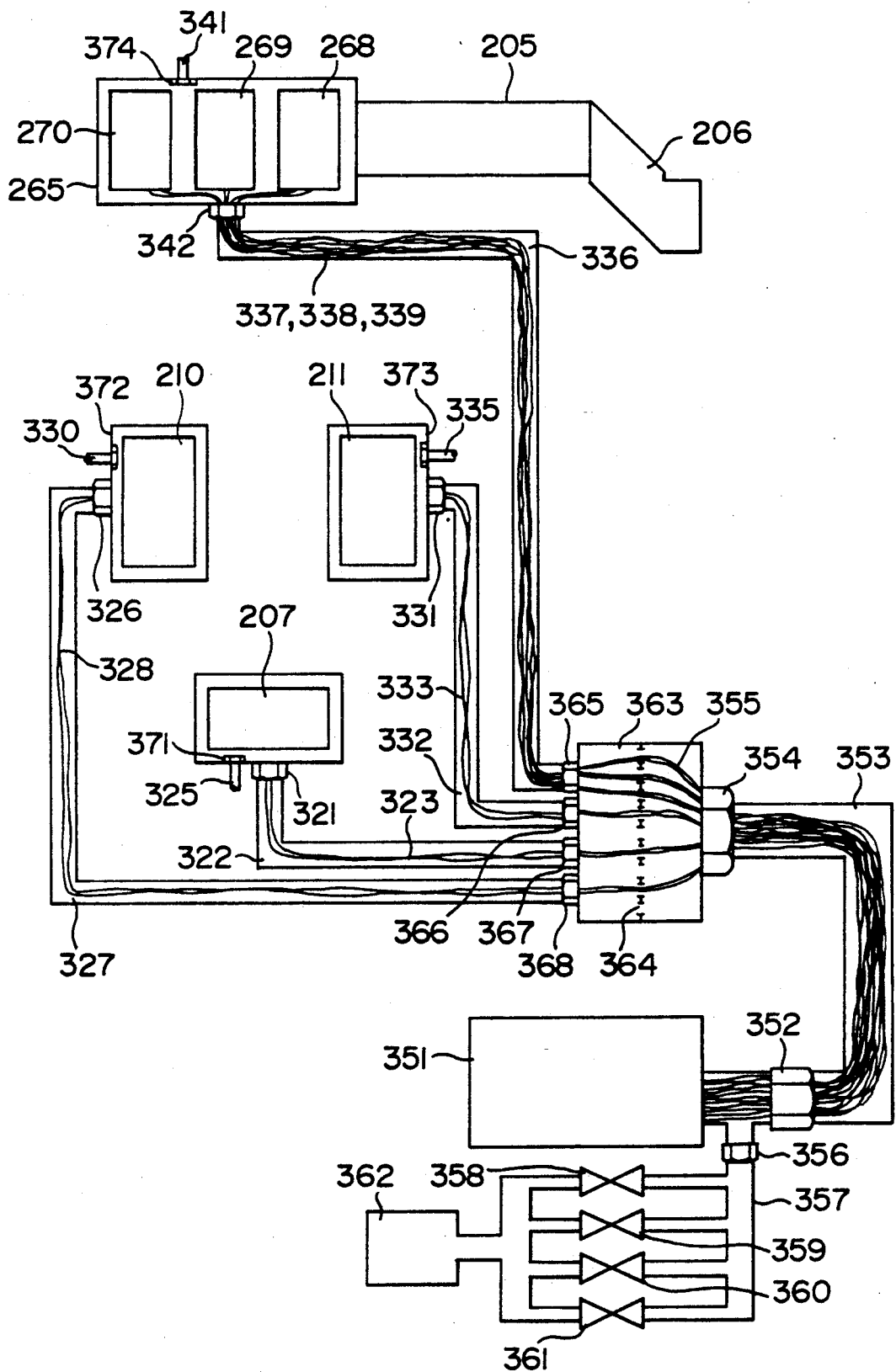
FIG. 6 is a schematic diagram illustrating tubes connected in the robot in FIG. 1.

Furthermore, as shown in FIG. 6, one end of a tube 353 is connected to a controller 151 via a connector 353, while the other end of the tube 353 is connected to a cooler (cooling unit) 355 via a connector 354. A connector 356 is attached to the connector 352 so that it guides air to the connector 352. A tube 357 is connected to the connector 356. The tube 357 is branched into four branch tube, which are connected to a compressor (a source for supplying a gas) 362 via valves 358, 359, 360 and 361. A drying unit 363 is provided in the cooler 355 such that it communicates with a plurality of communicating holes 364 in the cooler 355. Connector 365, 366, 367 and 368 are connected to the drying unit 363. To this connector, there are connected the foregoing tube 336, 332, 322 and 327. And also, the foregoing cable 323, 328, 333, 337, 338 and 339 are respectively connected to the controller 351. This controller 351 connects to the motors 207, 210, 211, 268, 269 and 270 via the connector 352, tube 353, connector 354, cooler 355 and drying unit 363.

In addition, temperature sensors 371, 372, 373 and 374 are respectively installed in the passages 226, 244, 259 and 315. Herein, valves (not shown in figure) are provided at the tubes 323, 330, 335 and 341.

(2) Operation

Next, description will be given with respect to the operation of the robot according to the first embodiment as described above.

First, description will be given with respect to the means for supplying a protective gas (i.e., compressed air, inert gases) to each motor. At the operating time of the compressor 362, a protective gas, for example, compressed air under a predetermined pressure (which is higher than the ambient pressure) is supplied to the cooler 355 via valves 358, 359, 360 and 361, tubes 357 and 353 from the compressor 351. This protective gas is cooled through the cooler 355, and is dried through the drying unit 363 and then flows in tube 322, 327, 332 and 336.

The protective gas having passed through the tube 322 is supplied to the space 224 of base 202 through tube 322, and then flows in the central hole 214 of motor 207 through the hole 225. The protective gas in the central hole 214 enters in the space 219 between the rotor 212 and stator 213 through the passage 228 and peripheral holes 215. Thus, the inside of the motor 207 is filled up with the protective gas, under a predetermined pressure (which is higher than an ambient pressure), which cools the motor 207, and reaches the tube 325 via communicating hole 220 and passage 226. In this case, the oil seal 221 prevents the protective gas in the motor 207 from leaking out.

Also, the protective gas having flowed in the tube 327 is supplied to the space 237 in cover 235 through tube 322, and then flows in the central hole 239 of motor 210 through the hole 240. The protective gas in the central hole 239 enters in the space between the rotor 232 and stator 234 through the passage 246 and peripheral holes 245. Thus, the inside of the motor 210 is filled up with the protective gas, under a predetermined pressure (which is higher than an ambient pressure), which cools the motor 210, and reaches the tube 330 via communicating hole 243 and passage 244. In this case, the oil seal 221 prevents the protective gas in the motor 210 from leaking out.

Furthermore, the protective gas having passed through the tube 332 is supplied to the space 254 in motor case 247 through tube 332, and then flows in the central hole 260 of motor 211 through the hole 255. The protective gas in the central hole 260 enters in the space between the rotor 250 and stator 248 through the passage 263 and peripheral holes 261. Thus, the inside of the motor 211 is filled up with the protective gas, under a predetermined pressure (which is higher than an ambient pressure), which cools the motor 211, and reaches the tube 335 via communicating hole 258 and passage 259. In this case, the oil seal 221 prevents the protective gas in the motor 211 from leaking out.

Moreover, the protective gas having passed through the tube 336 passes through the holes 274b and 275b in walls 274 and 275 of motor space 265, provided at the rear portion of second arm 205 through the tube 336, and is supplied to the space 309, 310 and 311. The protective gas in the space 309 passes throughholes 304 and peripheral holes 303, and then flows in the space between the rotor 277 and stator 271. Thus, the inside of the motor 268 is filled up with the protective gas, under a predetermined pressure (which is higher than an ambient pressure), which cools the motor 268, and reaches the tube 341 via communicating hole 312 and passage 315.

The protective gas in the space 310 passes throughholes 306 and peripheral holes 305, and then flows in the space between the rotor 278 and stator 272. Thus, the inside of the motor 269 is filled up with the protective gas, under a predetermined pressure (which is higher than an ambient pressure), which cools the motor 269, and reaches the tube 341 via communicating hole 313 and passage 315.

The protective gas in the space 311 passes throughholes 308 and peripheral holes 307, and then flows in the space between the rotor 279 and stator 273. Thus, the inside of the motor 270 is filled up with the protective gas, under a predetermined pressure (which is higher than an ambient pressure), which cools the motor 270, and reaches the tube 341 via communicating hole 314 and passage 315.

In these cases, the oil seal 221 in motors 268, 269 and 270 prevents the protective gas in these motor from leaking out.

Next, detailed description will be given with respect to cooling of the motors 207, 210, 211, 268, 269 and 270.

At the operating time of the robot as described above, temperatures in the motor 207, 210, 211, 268, 269 and 270 rise, in proportion to the operating time. When the temperatures, in the passages 226, 244, 259 and 315 communicating with motor 207, 210, 211, 268, 269 and 270, achieve predetermined values in temperature sensors 371, 372, 373 and 374, temperature sensors detect the facts and output first sensed signals to the controller 351.

Either of all valves 358, 359, 360 and 361 are opened, in response to instruction from the controller 351, thereby increasing a flow of the protective gas.

Thus, gas temperatures are lowered in each of the motors 207, 210, 211, 268, 269 and 270, so that the cooling of motors is accompanied.

On the other hand, when the temperatures in the passages 226, 244, 259 and 315 become lower than predetermined values in temperature sensors 371, 372, 373 and 374, the temperature sensors detect the facts and output second sensed signals to the controller 351. Either or all of valve 358 359, 360 and 361 are shut, in response to instruction from the controller 351, thereby decreasing a flow of the protective gas and returns the flow to the first situation. The protective gas flows through the above-mentioned components in the robot, all the time. When low temperatures are detected by the temperature sensors 371, 372, 373 and 374, only one or two of the valves 358, 359, 360 and 361 are opened, while when high temperatures are detected, all of four valves are opened.

Thus, by controlling the flow volume of protective gas, the temperatures in the motors can be controlled.

(3) Effects

The robot according to the first embodiment has the following effects.

Because the robot has the cooler for cooling down the electric motor thereof, the robot can operates under a high temperature. In addition, the robot can prevent the temperatures of the motor from rising, even at a large load.

And also, because valves are opened/shut by the controller in response to sensed signals from temperature sensors as described above, it is possible to control efficiently the flow of a protective gas. Then, because the electric motors are not only cooled, but also the cables for driving the electric motors are cooled at the same time, the efficiency of the electric power supply can be increased.

In addition, by measuring a temperature of an exhausted gas, the use conditions of motors can be properly known.

Furthermore, because the protective gas flows through the above-mentioned components in the robot, all the time, the inside of the robot can kept clean.

Although in the above-described embodiment, the flow of a protective gas are controlled by a plurality of on/off type valves, it may be continuously controlled by a single valve.

Also, the foregoing valves 358, 359, 360 and 361 may be located in the side of exhaust port, that it, the side of tubes 325, 330, 335 and 341.

[D] SECOND EMBODIMENT

(1) Construction

Next, description will be given with respect to a second embodiment of the present invention by referring to FIGS. 7 to 10 in the drawings.

Figure 7:
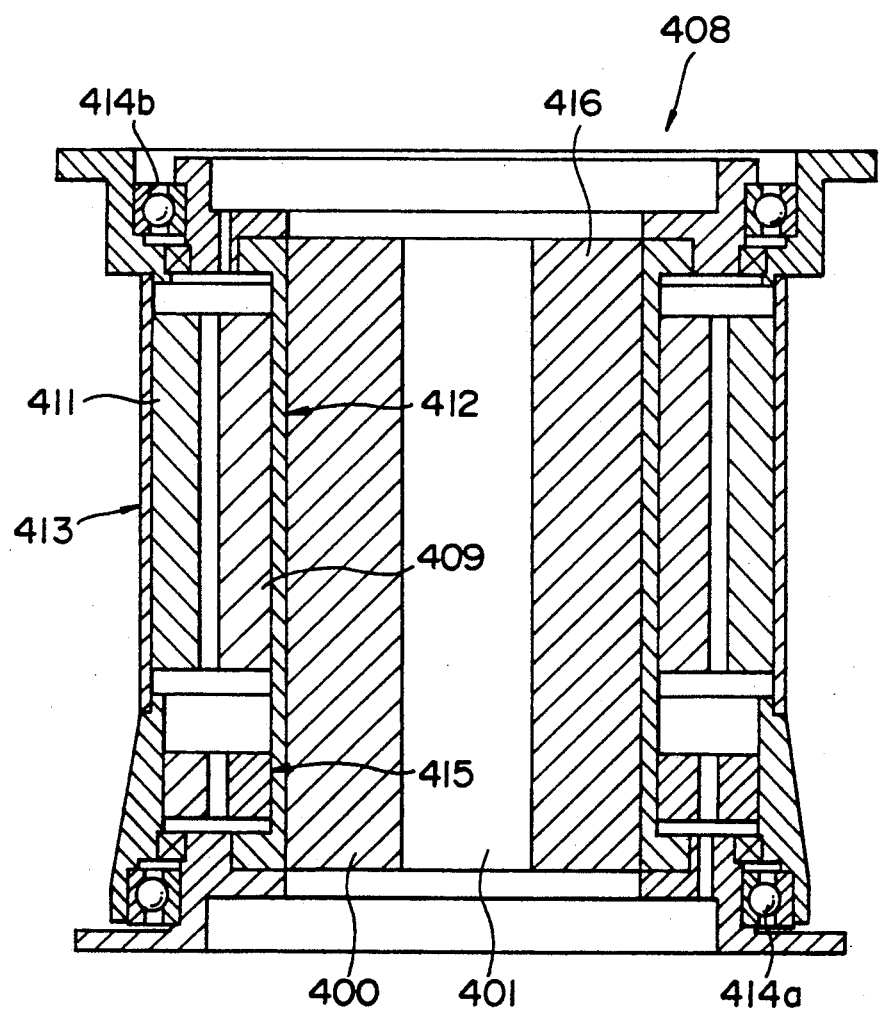
FIG. 7 is a side sectional view of a motor used in a second embodiment.

FIG. 7 is a side sectional view of a motor (direct-drive motor) used in the second embodiment.

As shown in this figure, the motor 408 is basically constructed by a stator 409, a rotor 411, an inner cylinder 412, an outer cylinder 413, bearing 414a and 414b, a position detector 415 and a filler member 400. Herein, the above-mentioned components 408, 409, 411, 412, 413, 414a, 414b and 415, except a filler member 400, are similar to the first embodiment. Hence, detailed description will be given with respect to the above filler member 400 only.

As shown in FIG. 7, a filler member 400 is filled in the open-ended hollow portion 416. This filler member 400 has an open-ended hollow construction in a coaxial manner with the central axis of the stator 409. That is, a cable passage 401 is formed in the filler member 400, so that electric cables K2, K3 and K4 (so shown in FIG. 9) can be inserted in. The filler member 400 has non-gas permeable, nonflammable and shock absorbing properties (for example, elastic property). Also, it is relatively lighter than the material for forming the stator 409 in weight. In addition, it is sufficiently soft that it does not damage the electric cables. In this embodiment, a foam phenol is used as a filler member.

Figure 8:
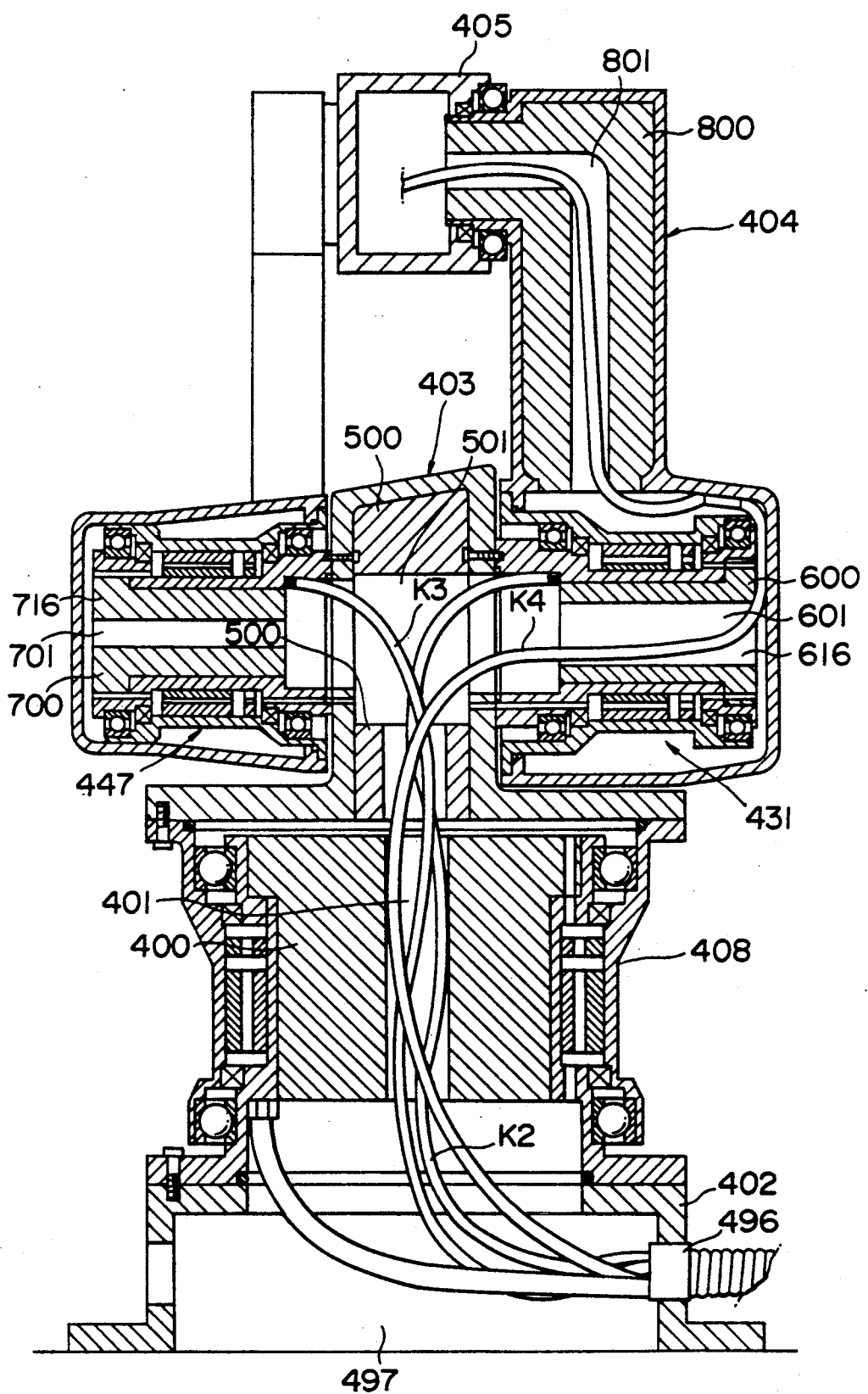
FIG. 8 is a vertical sectional view illustrating the robot body according to the second embodiment.
Figure 9:
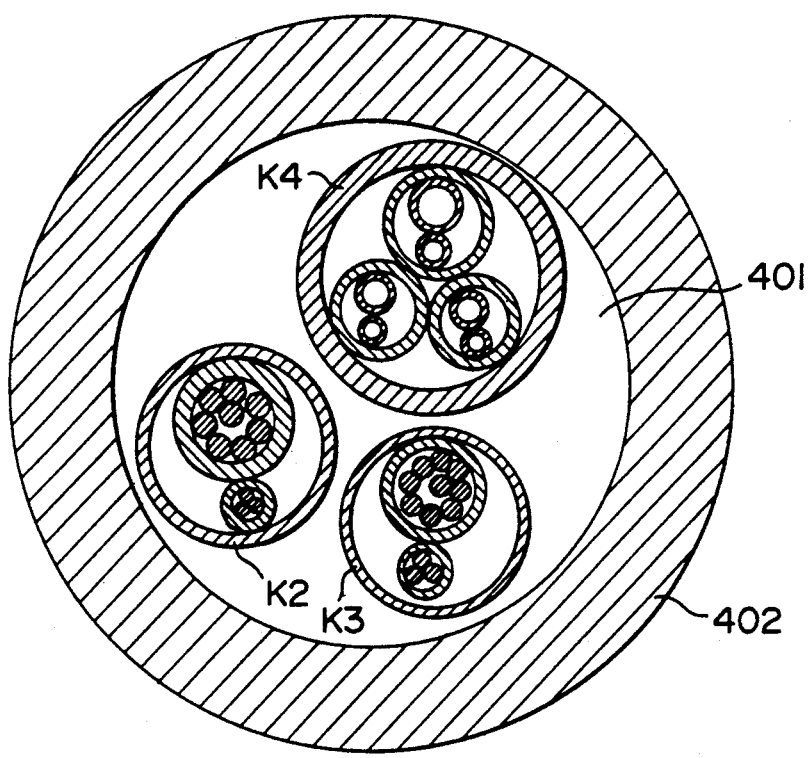
FIGS. 9 and 10 are sectional views of a filler member used in the second embodiment.

FIG. 8 is a vertical sectional view illustrating the robot body according to this embodiment.

As shown in this figure, this robot body is basically constructed by a fixed box 402, a rotary base 403, a first arm 404, a second arm 405, motors 408, 431 and 447 and a wrist portion (not shown). Herein, the above-mentioned components 402, 403, 404, 405, 408, 431 and 447 are similar to the first embodiment. The motors 431 and 447 have the construction similar to the foregoing motor 408 shown in FIG. 7. That is, as shown in FIG. 8, a filler member 600 is filled in the open-ended hollow portion 616 of the motor 431, while a filler member 700 is filled in the open-ended hollow portion of 716 the motor 447. In these filler members 600 and 700, cable passages 601 and 701 with hollow constructions are formed similarly to the foregoing filler member 400 in the motor 408, such that electric cables can inserted in. In addition, a filler member 500 is filled in the inside of the rotary table 403 constructed in a box-type construction. That is, a cable passage 501 having T-shaped construction is formed in the filler member 500, so that electric cables can be inserted in. Thus, the cable passages 401, 601 and 701 in the motors 408, 431 and 447 communicate with one another via T-shaped cable passage 501.

Further, a filler member 800 is filled in the hollow space of the first arm 404. A cable passage 801 with a hollow construction is formed in the filler member 800, such that electric cables can inserted in. And, the cable passage 901 communicates with the cable passage 601 in the motor 431. Thus, the electric cable K2 is connected to the motor 431 via a connector 496 and the cable passage 401, another electric cable K3 is connected to the motor 447 via the connector 496 and the cable passage 401. In addition, another electric cable K4 is connected to the motors mounted the second arm 405 via the connector 496, cable passages 401, 601 and 801.

(2) Operation

Next, description will be given with respect to the operation of the above described robot according to the second embodiment.

At the operating time of the robot, the above mentioned cable passages 401, 601, 701 and 801, the hollow space 497 of fixed box 402 and a cable passage (not shown) in the second arm 405 is perfectly filled with compressed air under a predetermined pressure (which is higher than the ambient pressure). The compressed air passes through the hollow space 497 in fixed box 402 through the connector 496, and then flows in the cable passage 401. A part of compressed air in the cable passage 401 flow in the gap between the stator and rotor in the motor 408, while the other compressed air flows in the cable passages 601 and 701 in motors 431 and 447 via the cable passage 501 in rotary table 403. A part of the compressed air in the cable passages 601 and 701 flows in the gaps between the stators and rotors. The other compressed air in the cable passage 601 of motor 431 passes through the cable passage 801 of first arm 404 and then flows in the cable passage of second arm 405. The compressed air flowing in the cable passage of second arm 405 finally reaches a hollow space at the tip end portion.

Thus, the air space of the robot is filled up with the compressed air.

(3) Effects

The robot according to the second embodiment has the following effects.

The motors used in the second embodiment have cable passages made from a filler material.

Therefore, the robot can prevent the electric cables from the damages, because they are out of contact with hot inner walls of the stators in motors.

In addition, the robot can prevent the electric cable from contacting with outer atmosphere.

Also, the robot does not need means for fixing electric cables, because they are supported by the filler members. Accordingly, the manufacturing of robot can be simplified.

Also, because meaningless parts of hollow spaces are filled with filler materials, the time required for scavenging can be shortened more than the scavenging time in the first embodiment.

In addition, because it use a nonflammable filler material as filler member, this embodiment has advantage that the explosion-proof function can be achieved with high efficiency and high reliability, more than in the first embodiment.

Furthermore, mechanical vibrations in the motors can be reduced, because filler materials absorbing vibration is used as filler members.

Figure 10:
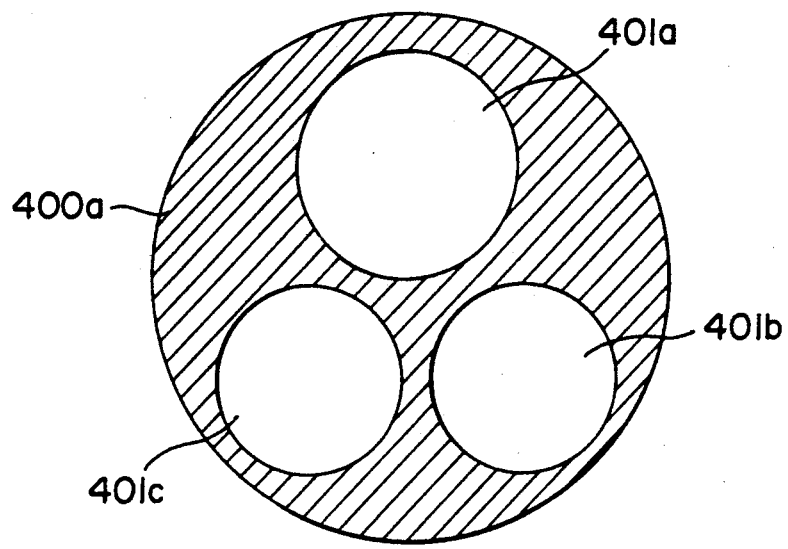

Although in the above described embodiment, each cable passage having a single cylindrical shape are formed in each filler member, the shape of the cable passage according to the present invention is not limited to this. For example, as shown in FIG. 10, three cable passages 401a, 401b and 401c may be formed in a filler member 400a. Accordingly to the shape in FIG. 10, the robot can prevent cables from contact with each other.

Also, although in the above mentioned embodiment, foam phenol are used as filler members, the filler member according to the present invention is not limited to this, if it has the above mentioned properties, for example non-metal.

Also, it ia more preferable that the above filler member has poor conductivity in heat.

In addition, although in the above mentioned embodiment, the electric cables are inserted in the cable passages, the present invention is not limited to this.

Furthermore, although in the above described embodiment, the motors have the outer-rotor type constructions, the motors according to the present invention is not limited to this. For example, the motors may have the inner-rotor type construction.

What is claimed is:

1. An industrial robot comprising:
   (a) a robot body forming a plurality of motor spaces;
   (b) a plurality of electric motors for driving the robot body, one of the electric motors being located in each of the motor spaces;
   (c) a plurality of guide passages in communication with the motor spaces for conducting a protective gas thereinto;
   (d) a plurality of exhaust passages in communication with the motor spaces for discharging the protective gas therefrom;
   (e) a gas supply means in communication with the guide passages for supplying the protective gas thereto at a pressure greater than an ambient pressure;
   (f) a plurality of temperature sensors, one of the temperature sensors being located in each of the motor spaces to sense the temperature therein; and
   (g) a plurality of gas control valves, one of the valves being located in each of the guide passages, and one of the valve being located in each of the exhaust passages, said valves controlling the flow of the protective gas through the motor spaces in response to changes in the temperatures sensed by the temperature sensors.

2. An industrial robot according to claim 1 including cooling means for cooling said protective gas flowing in said plurality of guide passages.

3. In an industrial robot, an assembly comprising:
   at least one electric motor including
      i) a stator having a density and forming an interior for receiving at least one electric wire,
      ii) a rotor extending around the stator, and
      iii) a first solid filler member mounted in the interior of the stator and having a density less than the density of the stator;
   at least one robot arm having a density, located adjacent to said one electric motor, and forming an interior for receiving said one electric wire and having at least one open end; and
   a second solid filler member mounted in the interior of the robot arm and having a density less than the density of the robot arm.

4. An industrial robot according to claim 3 wherein at least one throughhole is formed in each of said first and second filler members,
   wherein electric wires are inserted in said throughholes.

5. An industrial robot according to claim 3 wherein said first and second filler members are non-metal.

6. An industrial robot according to claim 3 wherein said first and second filler members have shock absorbing properties.

7. An industrial robot according to claim 3 wherein said first and second filler members are non-gas permeable.

8. An industrial robot according to claim 3 wherein said first and second filler members are made of nonflammable and foamed material.

9. An industrial robot according to claim 3 wherein said first and second filler members are made of foam phenol.

* * * * *